(12) United States Patent
Shidore et al.

(10) Patent No.: US 11,383,696 B2
(45) Date of Patent: Jul. 12, 2022

(54) METHOD AND APPARATUS FOR CONTROLLING A POWERTRAIN SYSTEM

(71) Applicant: GM GLOBAL TECHNOLOGY OPERATIONS LLC, Detroit, MI (US)

(72) Inventors: Neeraj S. Shidore, Novi, MI (US); Norman K. Bucknor, Troy, MI (US); Dongxu Li, Troy, MI (US); Mark Tadrous, West Bloomfield, MI (US); Derek F. Lahr, Howell, MI (US); Suresh Gopalakrishnan, Troy, MI (US); Venkatesh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 16/439,223

(22) Filed: Jun. 12, 2019

(65) Prior Publication Data
US 2020/0391724 A1 Dec. 17, 2020

(51) Int. Cl.
*B60W 20/40* (2016.01)
*B60W 20/10* (2016.01)
(Continued)

(52) U.S. Cl.
CPC ........... *B60W 20/40* (2013.01); *B60W 10/02* (2013.01); *B60W 10/06* (2013.01); *B60W 10/08* (2013.01);
(Continued)

(58) Field of Classification Search
CPC .... B60W 20/40; B60W 10/02; B60W 10/024; B60W 20/10; B60W 20/20;
(Continued)

(56) References Cited

U.S. PATENT DOCUMENTS 9,073,546 B2 * 7/2015 Kuroda ................. B60W 20/10
9,382,853 B2 7/2016 Phillips
(Continued)

FOREIGN PATENT DOCUMENTS

DE 102018103299 A1 * 8/2018 ......... F02D 41/0002
DE 102019128610 A1 * 4/2021 ............... B60K 6/48
(Continued)

OTHER PUBLICATIONS

Ess; Wolok, Fuschetto; Wang; Younkins; "Method to Compensate Fueling for Individual Firing Events in a Four-Cylinder Engine Operated with Dynamic Skip Fire"; SAE International, doi:10.4271/2018-01-1162, pp. 977-991.

*Primary Examiner* — Roger L Pang
(74) *Attorney, Agent, or Firm* — Quinn IP Law (57) ABSTRACT

A powertrain system configured to transfer torque to a driveline is described, and includes an internal combustion engine, a torque converter, a transmission, an electric machine, and a controller. The engine is configured to operate in one of an all-cylinder mode and a dynamic deactivation mode to generate an engine torque. The electric machine is configured to generate a motor torque. The motor torque and the engine torque combine to generate an output torque that is transferable to the driveline and is responsive to an output torque request. The controller is in communication with the engine, the torque converter, the transmission, and the electric machine. The controller includes an instruction set that is executable to operate the engine in the dynamic deactivation mode to generate engine torque, and operate the electric machine to generate motor torque to supplement the engine torque to generate the output torque.

17 Claims, 3 Drawing Sheets

(51) Int. Cl.
*B60W 20/20* (2016.01)
*B60W 10/02* (2006.01)
*B60W 30/18* (2012.01)
*B60W 10/06* (2006.01)
*B60W 10/08* (2006.01)
B60W 30/20 (2006.01)
B60W 10/10 (2012.01)

(52) U.S. Cl.
CPC ............ *B60W 20/10* (2013.01); *B60W 20/20* (2013.01); *B60W 30/18* (2013.01); *B60W 10/024* (2020.02); *B60W 10/10* (2013.01); *B60W 30/20* (2013.01); *B60W 2710/0666* (2013.01); *B60W 2710/083* (2013.01); *B60W 2710/105* (2013.01)

(58) Field of Classification Search
CPC ......... B60W 2710/0666; B60W 30/20; B60W 10/10; B60W 2710/105; B60W 2030/206; B60W 10/06; B60W 10/08; B60W 2710/083; B60W 30/1882

USPC ............................................................ 477/5
See application file for complete search history.

(56) References Cited

U.S. PATENT DOCUMENTS

| | | | |
|---|---|---|---|
| 9,441,550 B2 | 9/2016 | Li et al. | |
| 10,550,786 B1 * | 2/2020 | Haskara | B60W 10/06 |
| 2004/0035113 A1 * | 2/2004 | Hanada | B60W 10/08 |
| | | | 60/698 |
| 2005/0038576 A1 * | 2/2005 | Hara | B60K 6/48 |
| | | | 701/22 |
| 2015/0197232 A1 * | 7/2015 | Heap | B60W 10/06 |
| | | | 701/22 |
| 2015/0354470 A1 | 12/2015 | Li et al. | |

FOREIGN PATENT DOCUMENTS

| | | | | |
|---|---|---|---|---|
| KR | 20030037637 A | * | 5/2003 | |
| WO | WO-2018039078 A1 | * | 3/2018 | ............ B60W 10/06 |

* cited by examiner

METHOD AND APPARATUS FOR CONTROLLING A POWERTRAIN SYSTEM

TECHNICAL FIELD

The present disclosure relates to powertrain systems for vehicles, and control related thereto.

BACKGROUND

Vehicle powertrain systems include internal combustion engines and electric machines that are coupled to transmissions to transfer torque to a driveline for tractive effort. Engines may selectively employ cylinder deactivation routines to reduce fuel consumption. Cylinder deactivation routines may be precluded from operating at low engine speeds and low transmission gear ratios due to noise and vibration issues associated with such operation.

There may be a benefit, in terms of reduced fuel consumption and reduced noise and vibration, to coordinate operation of an electric machine and an internal combustion engine to expand and control utilization of certain cylinder deactivation routines.

SUMMARY

A powertrain system configured to transfer torque to a driveline is described, and includes an internal combustion engine (engine), a torque converter, a transmission, an electric machine, and a controller. The engine is configured to operate in one of an all-cylinder mode and a dynamic deactivation mode to generate an engine torque. The electric machine is configured to generate a motor torque. The motor torque and the engine torque combine to generate an output torque that is transferable to the driveline and is responsive to an output torque request. The controller is in communication with the engine, the torque converter, the transmission, and the electric machine. The controller includes an instruction set that is executable to operate the engine in the dynamic deactivation mode to generate engine torque, and operate the electric machine to generate motor torque to supplement the engine torque to generate the output torque.

An aspect of the disclosure includes the instruction set executable to determine a first energy cost associated with a torque converter clutch slip that may be implemented to damp vibration induced by operation of the engine in the dynamic deactivation mode, determine a second energy cost associated with operating the electric machine to damp vibration induced by operation of the engine in the dynamic deactivation mode, and control the electric machine to damp vibration induced by operation of the engine in the dynamic deactivation mode when the second energy cost is less than the first energy cost.

Another aspect of the disclosure includes the instruction set being executable to determine an engine power trajectory, determine a magnitude of loss associated with a transition from a first dynamic deactivation state to a second dynamic deactivation state in response to the engine power trajectory, control the electric machine to generate motor torque based upon the magnitude of loss associated with the transition from the first dynamic deactivation state to the second dynamic deactivation state, and control the engine dynamic deactivation state to one of the first dynamic deactivation state and the second dynamic deactivation state.

Another aspect of the disclosure includes the instruction set being executable to control the engine dynamic deactivation state to the first dynamic deactivation state, and control the electric machine to generate motor torque to maintain operation of the engine in the first dynamic deactivation state to avoid a transition to the second dynamic deactivation state when the magnitude of loss associated with a transition from the first state to the second state is greater than a power cost of running the electric machine to generate motor torque to supplement the engine torque in response to the engine power trajectory.

Another aspect of the disclosure includes the instruction set being executable to control the engine dynamic deactivation state to transition to the second dynamic deactivation state when the magnitude of loss associated with the transition from the first dynamic deactivation state to the second dynamic deactivation state is less than a power cost of running the electric machine to generate motor torque to supplement the engine torque in response to the engine power trajectory.

Another aspect of the disclosure includes the instruction set being is executable to determine the engine power trajectory over a finite time horizon.

Another aspect of the disclosure includes the instruction set being executable to control the transmission in a low transmission gear state, and control the electric machine to generate motor torque to maintain operation of the engine in the dynamic deactivation mode at the low transmission gear state.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

Figure 1:
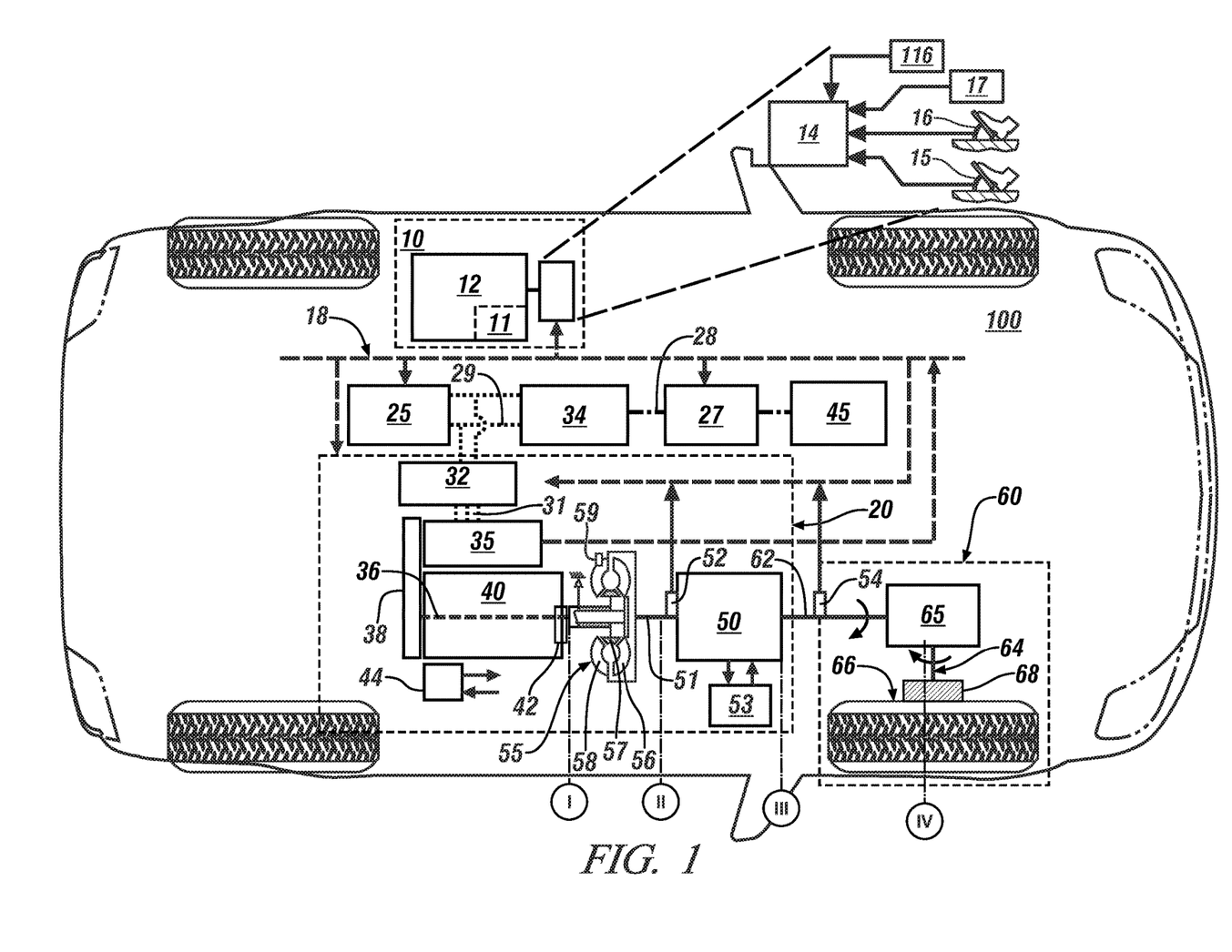
FIG. 1 schematically illustrates a vehicle including a powertrain system that includes an engine that is coupled to a transmission via a torque converter, and an electric machine, wherein the powertrain system couples to a driveline of the vehicle, in accordance with the disclosure.

Referring now to the drawings, wherein the showings are for the purpose of illustrating certain exemplary embodiments and not for the purpose of limiting the same, FIG. 1 schematically shows a vehicle 100 including a powertrain system 20 coupled to a driveline 60 and controlled by a control system 10. Like numerals refer to like elements throughout the description. The illustrated powertrain system 20 includes multiple torque-generating devices including a multi-cylinder internal combustion engine (engine) 40 and at least one electrically-powered torque machine (electric machine) 35 that transfer torque through a transmission 50 to a driveline 60. The concepts described herein may apply to powertrain configurations that include the internal combustion engine 40 and the electric machine 35 coupled via the transmission 50 to the driveline 60.

In one embodiment, the powertrain system 20 includes the electric machine 35 rotatably mechanically coupled to a crankshaft 36 of the engine 40 that rotatably mechanically couples to an input member 33 of the transmission 50 via a torque converter 55. As shown, a pulley mechanism 38 is arranged on a front portion of the engine 40 to mechanically rotatably couple the crankshaft 36 and the electric machine 35. The pulley mechanism 38 is configured to effect torque transfer between the engine 40 and the electric machine 35, including transferring torque from the electric machine 35 to the engine 40 for engine autostart and autostop operations, tractive torque assistance, torque transfer for regenerative vehicle braking, and torque transfer from engine 40 to the electric machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the electric machine 35, referred to as a belt-alternator-starter (BAS) system. Alternatively, the pulley mechanism 38 may include a positive-displacement gearing mechanism, or another positive mechanical connection. As such, the electric machine 35 can be employed to rotate the engine 40.

Alternative configurations of the powertrain system 20 that include the electric machine 35 rotatably mechanically coupled to the engine 40 or another element of the powertrain system 20 may be employed within the scope of this disclosure.

In one embodiment, this includes the electric machine 35 being arranged to rotatably mechanically couple to the crankshaft 36 of the engine 40 on a rear portion of the engine 40, in front of the torque converter 55, as indicated by Roman numeral I.

In one embodiment, this includes the electric machine 35 being arranged to rotatably mechanically couple to an input member 51 of the transmission 50, between the torque converter 55 and the transmission 50, as indicated by Roman numeral II.

In one embodiment, this includes the electric machine 35 being arranged to rotatably mechanically couple to an intermediate member (not shown) of the transmission 50.

In one embodiment, this includes the electric machine 35 being arranged to rotatably mechanically couple to an output member 62 of the transmission 50, as indicated by Roman numeral III.

In one embodiment, this includes the electric machine 35 being arranged to rotatably mechanically couple to a rotatable member of the driveline 60, as indicated by Roman numeral IV. This may include the electric machine 35 being coupled to an input member of a front driveshaft, transaxle, or differential (not shown). Alternatively, this may include the electric machine 35 being coupled to a front axle (not shown). This may include the electric machine 35 being coupled to an input member of a rear driveshaft or differential (not shown). This may include the electric machine 35 being coupled to a rear axle or a rear transaxle (not shown).

The electric machine 35 is a high-voltage multi-phase electric motor/generator configured to convert stored electric energy to mechanical power and convert mechanical power to electric energy that may be stored in a high-voltage energy storage device (battery) 25. The battery 25 may be a high-voltage energy storage device, e.g., a multi-cell lithium ion device, an ultra-capacitor, or another device without limitation. Monitored parameters related to the battery 25 may include a state of charge (SOC), temperature, and others. In one embodiment, the battery 25 may electrically connect via an on-vehicle battery charger (not shown) to a remote, off-vehicle electric power source for charging while the vehicle 100 is stationary. The battery 25 electrically connects to an inverter module 32 via a high-voltage DC bus 29 to transfer high-voltage DC electric power via three-phase conductors 31 to the electric machine 35 in response to control signals originating in the control system 10.

The electric machine 35 includes a rotor and a stator, and electrically connects via the inverter module 32 and the high-voltage bus 29 to the battery 25. The inverter module 32 is configured with control circuits including power transistors, e.g., IGBTs for transforming high-voltage DC electric power to high-voltage AC electric power and transforming high-voltage AC electric power to high-voltage DC electric power. The inverter module 32 may employ pulsewidth-modulating (PWM) control of the IGBTs to convert stored DC electric power originating in the battery 25 to AC electric power to drive the electric machine 35 to generate torque. Similarly, the inverter module 32 converts mechanical power transferred to the electric machine 35 to DC electric power to generate electric energy that is storable in the battery 25, including as part of a regenerative braking control strategy. The inverter module 32 receives motor control commands and controls inverter states to provide the motor drive and regenerative braking functionality. In one embodiment, a DC/DC electric power converter 34 electrically connects to the high-voltage bus 29, and provides electric power to a low-voltage battery 27 via a low-voltage bus 28. The low-voltage battery 27 electrically connects to an auxiliary power system to provide low-voltage electric power to low-voltage systems 45 on the vehicle 100, including, e.g., electric windows, HVAC fans, seats, and other devices.

The engine 40 converts fuel to mechanical torque through a thermodynamic combustion process. The engine 40 is equipped with a plurality of actuators and sensing devices for monitoring operation and delivering fuel to form in-cylinder combustion charges that generate an expansion force onto pistons, with such force transferred to the crankshaft 36 to produce torque. One sensing device for monitoring the engine 40 is a Hall-effect sensor 42 or another sensor that may be configured to monitor rotational speed of the crankshaft 36 to determine engine rotational speed (RPM). The actuators of the engine 40 are controlled by an engine controller (ECM) 44. The engine 40 is mechanized with hardware and the ECM 44 includes executable routines to execute autostart and autostop functions, fueled and fuel cutoff (FCO) functions, and an all-cylinder mode and a dynamic deactivation mode during ongoing operation of the powertrain system 20. The engine 40 is considered to be in an OFF state when it is not rotating. The engine 40 is considered to be in an ON state when it is rotating. The all-cylinder mode includes engine operation wherein all of the engine cylinders are activated by being fueled and fired. The dynamic deactivation mode includes engine operation wherein one or a plurality of the engine cylinders are deactivated by being unfueled and unfired, and operating with engine exhaust valves in open states to minimize pumping losses, while the remaining cylinders are fueled and fired and thus producing torque. The FCO state includes the engine 40 spinning and unfueled.

The term "dynamic deactivation", and related terms can be understood as a fraction of the total number of engine cylinders that are activated over an engine combustion cycle, i.e., over two engine rotations (720 degrees of rotation) to achieve a requested or desired engine torque. When operating in the dynamic deactivation mode, the ECM 44 generates a firing command for a future (e.g., next) cylinder in a predetermined firing order of the cylinders based on the target dynamic deactivation state. The firing command may be a value that indicates whether the future cylinder is to be activated or deactivated. For example, the ECM 44 may set the firing command to 1 when the future cylinder is to be activated and set the firing command to 0 when the future cylinder is to be deactivated. A target dynamic deactivation state may correspond to a portion of the total number of cylinders of the engine 40 that are to be activated to achieve the requested engine torque. The target dynamic deactivation state may be a value between 0.0 and 1.0, and the target dynamic deactivation state may be determined based upon numerous criteria, which include but are not limited to minimizing engine fuel consumption while meeting engine load demand, subject to NVH constraints, and constraints on transitions to other dynamic deactivation states relative to the current dynamic deactivation state.

The all-cylinder mode describes an operating mode in which all of the cylinders of the engine are activated (and zero of the cylinders are deactivated).

The torque converter 55 may be a fluidic torque coupling device arranged between the engine 40 and transmission 50, including a pump 56 rotatably coupled to the crankshaft 36, a stator 57, an impeller 58 rotatably coupled to the input member 51 to the transmission 50, and a torque converter clutch 59. The torque converter 55 operates to provide fluidic torque coupling between the pump 56 and the impeller 58 when the torque converter clutch 59 is deactivated or released, and provides mechanical torque coupling between the pump 56 and the impeller 58 when the torque converter clutch 59 is activated. There may be a differential in rotational speeds of the pump 56 and the impeller 58 when the torque converter clutch 59 is deactivated or released due to the fluid torque coupling, referred to as torque converter clutch slip. Torque converter clutch slip is measurable employing rotational speed sensors.

The transmission 50 may be arranged in a step-gear configuration in one embodiment, and may include one or more differential gear sets and activatable clutches configured to effect torque transfer in one of a plurality of fixed gear states over a range of speed ratios between the engine 40, the input member 51 and the output member 62. The transmission 50 may include a first rotational speed sensor 52 in the form of a Hall-effect sensor or another sensor that may be configured to monitor rotational speed of the input member 51 and/or a second rotational speed sensor 54 that may be configured to monitor rotational speed of the output member 62. The transmission 50 includes various configurations, and may be an automatic transmission that automatically shifts between the fixed gear states to operate at a gear ratio that achieves a match between an output torque request and an engine operating point. The transmission 50 automatically executes upshifts to shift to a gear state having a lower numerical multiplication ratio (gear ratio) at preset speed/load points and executes downshifts to shift to a gear state having a higher numerical multiplication ratio at preset speed/load points. The transmission 50 may be controlled using a controllable hydraulic circuit that communicates with a transmission controller (TCM) 53, which may also control activation of the torque converter clutch 59. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Transmission operation may be described in context of a control variable that may be communicated to the transmission 50 that is related to a selected fixed gear state.

The driveline 60 may include a gearset 65 that mechanically couples to one or more axles 64 that mechanically couple to one or more wheels 66 in one embodiment. The driveline 60 transfers tractive power between the output member 62 of the transmission 50 and a road surface. Each of the wheels 66 includes a friction brake 68, which is controllable by the controller 12 and/or a brake controller (not shown) in response to operator input to a brake pedal 16.

The gearset 65 of the driveline 60 may be in the form of a front transaxle and half-shafts (not shown) that rotatably coupled the output member 62 of the transmission 50 to one or more of the wheels 66. Alternatively, the gearset 65 may be in the form of a rear differential and axles that rotatably coupled the output member 62 of the transmission 50 to one or more of the wheels 66. Alternatively, the gearset 65 may be in the form of both a front transaxle arranged in conjunction with a rear driveshaft coupled to a differential that rotatably coupled the output member 62 of the transmission 50 to one or more of the wheels 66. Alternatively, or in addition, a power take-off (PTO) gear box (not shown) may be rotatably coupled to the output member 62 of the transmission 50. The powertrain system 20 is illustrative, and the concepts described herein apply to other powertrain systems that are similarly configured.

The control system 10 includes a controller 12 that signally connects to an operator interface 14. The controller 12 may include a control device 11 that provides hierarchical control of a plurality of control devices that are co-located with the individual elements of the powertrain system 20 to effect operational control thereof, including, e.g., the inverter module 32, the ECM 44 and the TCM 53. The controller 12 communicates with each of the inverter module 32, the ECM 44 and the TCM 53, either directly or via a communication bus 18 to monitor operation and control operations thereof.

The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal 15, brake pedal 16, a transmission range selector (PRNDL) 17, a steering wheel, and a cruise control actuator 116. The accelerator pedal 15 provides signal input including an accelerator pedal position indicating an operator request for vehicle acceleration and the brake pedal 16 provides signal input including a brake pedal position indicating an operator request for vehicle braking. The transmission range selector 17 provides signal input indicating direction of operator-intended motion of the vehicle 100 including a discrete number of operator-selectable positions that indicate the desired rotational direction of the output member 62 in either a forward or a reverse direction. Operator inputs to the accelerator pedal 15, the brake pedal 16, the transmission range selector 17, and the cruise control actuator 116 form an output torque request, which is employed by the controller 12 to determine commands for controlling the various torque actuators such as the engine 40, the electric machine 35, the transmission 50 and the friction brakes 68. As employed herein, the term "output torque" refers to a combination of torque generated by the torque actuators including the engine 40, i.e., engine torque, and the electric machine 35, i.e., motor torque, and multiplied through the transmission 50 and the driveline 60 for delivery to the vehicle wheels 66. As such, the engine torque can be dissociated from the output torque.

The output torque may be positive, i.e., indicating acceleration, or negative, i.e., deceleration. As employed herein, the term "axle torque" refers to the magnitude of torque delivered to the axle(s) 64 and transferred to the wheels 66. The axle torque comprehends and may include torque input via the friction brakes 68. The axle torque may be positive, indicating acceleration, or negative, indicating deceleration. The axle torque and the output torque are related by gear ratios through the gearset 65.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link, a serial peripheral interface bus or another communication link. Communication includes exchanging data signals in various forms, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold and the operator request to the accelerator pedal is at a point that is less than required to maintain the present vehicle speed. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal.

The concepts described herein relate to operating an embodiment of the powertrain system 20 described with reference to FIG. 1, employing the electric machine 35 to expand the dynamic range of operation of the engine 40 in the dynamic deactivation mode and synergistically operate the electric machine 35 to improve fuel economy and reduce fuel consumption, reduce parameters associated with NVH and, improve operator perception. Overall, this includes operating the engine 40 in the dynamic deactivation mode to generate engine torque, and coincidentally operating the electric machine to generate motor torque to supplement the engine torque to generate the output torque in a manner that may improve fuel economy, reduce fuel consumption, reduce parameters associated with NVH, and improve operator perception. As such, the concepts include employing the powertrain system 20 to enhance the fuel economy benefits of operating in the dynamic deactivation mode and reduce drivability issues associated with operating in the dynamic deactivation mode.

Figure 2:
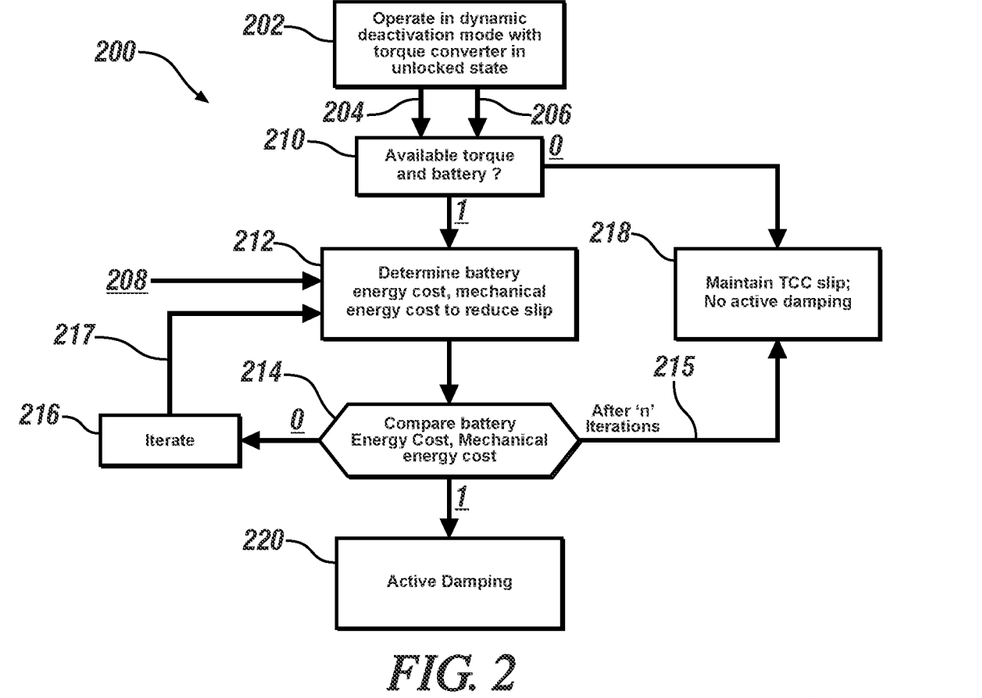
FIG. 2 schematically illustrates a first control routine controlling an embodiment of the powertrain system described with reference to FIG. 1, to selectively operate the engine in one of an all-cylinder mode and a dynamic deactivation mode to generate torque, in accordance with the disclosure.

FIG. 2 schematically shows a first control routine 200 for controlling an embodiment of the powertrain system 20 described with reference to FIG. 1, including the engine 40 and the electric machine 35, wherein the engine 40 is selectively operative in the all-cylinder mode and the dynamic deactivation mode to generate torque during operation of the powertrain system 20. The first control routine 200 relates to operating the engine 40 in the dynamic deactivation mode to generate engine torque, and coincidentally operating the electric machine 35 to generate motor torque to supplement the engine torque to generate the output torque.

Operating the engine 40 in the dynamic deactivation mode may generate torsional vibration that may be propagated to a passenger compartment of the vehicle 100 via the powertrain system 20 and the driveline 60. Under certain conditions, the operation of the engine 40 in the dynamic deactivation mode may be coupled with operating the torque converter clutch 59 in a controlled slip state, wherein the magnitude of the controlled slip is selected to damp vibration induced by operation of the engine 40 in the dynamic deactivation mode (202). Such operation may permit the torque converter 55 to absorb or otherwise mitigate torsional vibration that may be generated by the engine 40 when operating in the dynamic deactivation mode. During operation in the dynamic deactivation mode, the controller 12 monitors parameters associated with the electric machine 35 and the battery 25 to determine whether there is available motor torque (204) and available battery energy (206) to operate the electric machine 35 in a manner that permits operation that counteracts and/or otherwise damps the torsional vibration that is generated by operation of the engine 40 in the dynamic deactivation mode. Coincidentally, the controller 12 may monitor the slip across the torque converter 55 via the TCM 53, i.e., the torque converter clutch slip 208.

When there is available motor torque (204) and available battery energy (206) to operate the electric machine 35 in the manner described (210)(1), the controller 12 operates as follows. A first energy cost is determined, and includes a battery energy cost to reduce the torque converter clutch slip. The battery energy cost to reduce the torque converter clutch slip is determined based upon a magnitude of battery energy that would be expended to reduce the torque converter clutch slip 208 from its present value to a target torque converter clutch slip 217, which is less than the present value of the torque converter clutch slip 208. A second energy cost is determined, and includes a reduction in mechanical energy cost that would be realized by reducing the torque converter clutch slip (212).

The first energy cost and the second energy cost are compared (214). When the first energy cost is less than the second energy cost, i.e., when the battery energy cost to reduce the torque converter clutch slip is less than the reduction in mechanical energy cost that would be realized by reducing the torque converter clutch slip (214)(1), the routine 200 proceeds to employ the electric machine 35 to generate torque to actively damp the torsional vibration that is generated by operation of the engine 40 in the dynamic deactivation mode (220). Furthermore, inertia in the electric machine 35 also helps in active damping.

When the first energy cost is greater than the second energy cost, i.e., when the battery energy cost to reduce the torque converter clutch slip is greater than the reduction in mechanical energy cost that would be realized by reducing the torque converter clutch slip (214)(0), the routine 200 executes a quantity of n iterations 216 during which the routine 200 attempts to change operation such that the first energy cost becomes less than the second energy cost, in order to permit operation of the electric machine 35 to generate torque to actively damp the torsional vibration that is generated by operation of the engine 40 in the dynamic deactivation mode.

When the quantity of n iterations 216 occur during which the first energy cost remains greater than the second energy cost (215), the routine 200 commands operation of the torque converter such that the torque converter clutch slip is maintained, and the present attempt to employ the electric machine 35 to generate torque to actively damp the torsional vibration that is generated by operation of the engine 40 in the dynamic deactivation mode is discontinued (218).

When the available motor torque (204) is insufficient, the available battery energy (206) is insufficient to operate the electric machine 35 in the manner described (210)(0), the present attempt to employ the electric machine 35 to generate torque to actively damp the torsional vibration that is generated by operation of the engine 40 in the dynamic deactivation mode is discontinued (218). In this case, damping is achieved by the torque converter 55 without assistance from the electric machine 35.

In this way, when there is sufficient electrical energy in the battery 25, and the electric machine 35 is capable of generating sufficient torque, the electric machine 35 can be controlled to actively damp the torsional vibration induced by operation of the engine 40 in the dynamic deactivation mode so long as the energy cost is less than the energy cost associated with operating at a target level of torque converter clutch slip.

Furthermore, the energy losses induced by operation of various elements and actuators of the powertrain system 20 can be subjected to arbitration to minimize total losses induced by the engine 40 and the electric machine 35, taking into consideration losses associated with the dynamic deactivation transition and torque converter clutch slip loss. The energy losses relate to selectively operating the engine 40 in the dynamic deactivation mode to generate engine torque, and coincidentally operating the electric machine 35 to generate motor torque to supplement the engine torque to generate the output torque.

The energy losses for the powertrain system 20 can be characterized and quantified by the following power loss objective function, shown with reference to Eq. 1:

$$\text{Objective} = \min(P\text{loss, engine} + P\text{loss, motor} + P\text{loss, battery} + P\text{loss, trans} + P\text{loss}(f(SOC_{target} - SOC_{current})) + P\text{loss}_{ff\,transition} * e^{-\alpha t} + P\text{loss, brake} + P\text{loss, acc}) \quad [1]$$

wherein:
Ploss, engine represents power loss associated with the engine 40;
Ploss, motor represents power loss associated with the electric machine 35;
Ploss, battery represents power loss associated with the electrical system including the battery 25, high-voltage bus 29, and inverter 32;
Ploss, trans represents power loss associated with the transmission;
Ploss (f(SOCtarget−SOC current)) represents power loss associated with charging of the battery 25 to the target SOC state;
Ploss, brake represents power loss associated with mechanical braking that is not recovered by regenerative braking operation;
Ploss, acc represents power loss associated with operating on-vehicle accessories; and
Ploss ff transition represents power loss associated with executing a dynamic deactivation transition.

The power loss associated with executing the dynamic deactivation transition, $Ploss_{ff\,transition}$, represents the power loss that occurs when the engine 40 transitions from operating in a first dynamic deactivation state to operating in a second dynamic deactivation state, or when the engine 40 transitions between operating in a dynamic deactivation state and operating in the all-cylinder mode. The power loss associated with executing the dynamic deactivation transition, $Ploss_{ff\,transition}$, may be determined as follows in Eq. 2.

$$Ploss_{ff\,transition} = f(\text{engine torque, speed, target } ff, \text{current } ff, \text{slip}) \quad [2]$$

wherein:

target ff represents the target dynamic deactivation state, and current ff represents the current dynamic deactivation state.

The loss parameters include but are not limited to engine losses induced by spark retard, cam phaser position changes, and torque converter clutch slip overshoot that may occur while implementing the dynamic deactivation transition.

The power loss objective function shown with reference to Eq. 1 is periodically executed to determine a desired combination of the aforementioned power losses that minimizes the power loss, wherein the engine 40 is selectively operative in one of the all-cylinder mode and the dynamic deactivation mode to generate torque during operation of the powertrain system 20, and the electric machine 35 is selectively operative to generate motor torque to supplement the engine torque to generate the output torque.

Arbitration may include executing multiple calculations of Eq. 1 to evaluate multiple operating scenarios in response to a change in an output torque request. By way of a non-limiting example, a change in an output torque request may be in the form of an increase in the output torque request, and the evaluated operating scenarios may include a first scenario that includes achieving the increase in the output torque request by increasing the torque output from the engine 40 with a transition in the dynamic deactivation state, and a second scenario that includes achieving the increase in the output torque request by increasing the torque output from the engine 40 without a transition in the dynamic deactivation state and in conjunction with increasing the torque output from the electric machine 35. The power loss objective function of Eq. 1 can be executed for both the first scenario and the second scenario, and the scenario that results in a minimum power loss can be selected for implementation. As such, the outcome of this calculation may include avoiding or delaying a transition from a first dynamic deactivation state to a second dynamic deactivation state due to energy loss associated with the dynamic deactivation state transition, and instead controlling the electric machine 35 to fill the gap between the output torque request and the engine torque that is generated by the engine 40 while operating in the first dynamic deactivation state.

Figure 3:
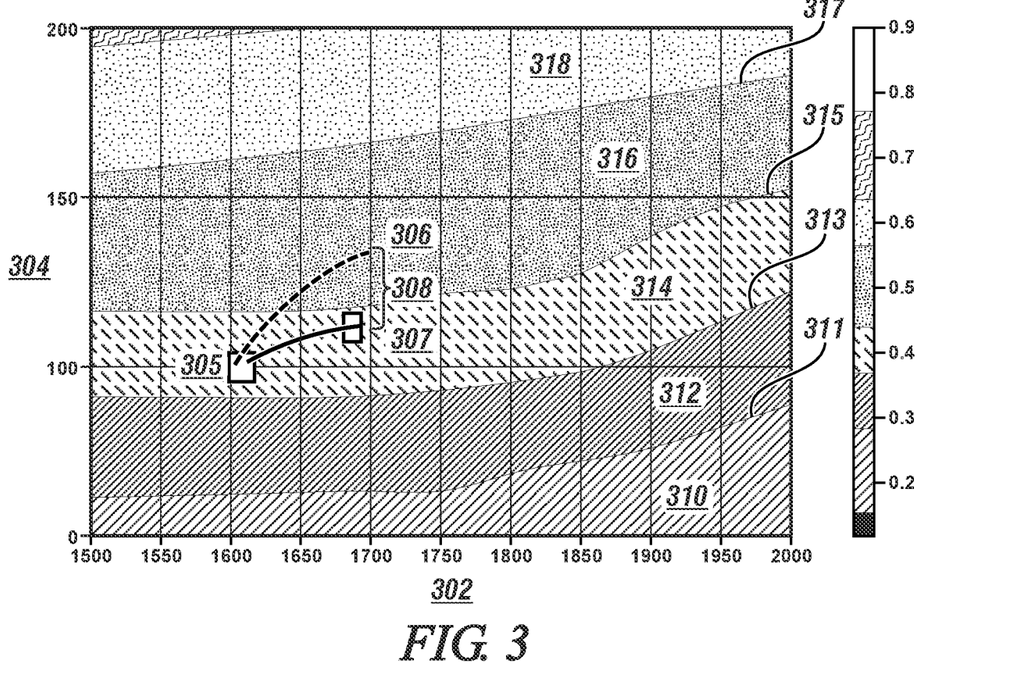
FIG. 3 graphically shows a first engine power trajectory and a second engine power trajectory between an initial speed/torque point and a desired speed/torque point in relation to a plurality of dynamic deactivation operating regions that are shown in relation to speed and torque, in accordance with the disclosure.

FIG. 3 graphically shows a plurality of dynamic deactivation operating regions 310, 312, 314, 316, and 318, with associated transition lines 311, 313, 315, 317, which are shown in relation to engine speed 302 and engine torque 304, which is described with reference to an embodiment of the vehicle 100 that is described with reference to FIG. 1. The transition lines 311, 313, 315, 317 indicate speed/torque operating points at which an embodiment of the engine 40 is commanded to transition between adjacent ones of the dynamic deactivation operating regions 310, 312, 314, 316, and 318. An initial speed/torque point 305 is indicated, along with a desired speed/torque point 306, which correspond to an initial axle torque point and a desired axle torque point, respectively. A first engine power trajectory is shown between the initial speed/torque point 305 and the desired speed/torque point 306, and indicates that the engine 40 will be commanded to transition between a first of the dynamic deactivation regions 314 and a second of the dynamic deactivation operating regions 316 to meet the desired speed/torque point 306. A second engine power trajectory is shown between the initial speed/torque point 305 and a second speed torque point 307, wherein the electric machine 35 is controlled to generate motor torque to fill the gap between the initial speed/torque point 305 and the desired speed/torque point 306, which is indicated by element 308. This action permits the engine 40 to continue to operate in the first of the dynamic deactivation operating regions 314, and avoid power loss that otherwise cause a transition in the commanded dynamic deactivation state. The first engine power trajectory and the second engine power trajectory may be determined based upon an immediate request for a change in engine power, in one embodiment. Alternatively, the first engine power trajectory and the second engine power trajectory may be determined based upon a projected request for a change in engine power over a finite time horizon, in one embodiment.

The decision to control the engine 40 and the electric machine 35 in the manner described can be determined and decided by evaluation results associated with the power loss objective function that is shown with reference to Eq. 1, when such evaluation results indicate that power loss is minimized by avoiding the dynamic deactivation state transition. Under certain operating conditions, the first engine power trajectory between the initial speed/torque point 305 and the desired speed/torque point 306 may be followed, including commanding the engine 40 to transition between the first of the dynamic deactivation regions 314 and the second of the dynamic deactivation regions 316 to meet the desired speed/torque point 306. Such operating conditions may include a low SOC of the battery 25, or an inability of the electric machine 35 to fill the torque gap between the initial speed/torque point 305 and the desired speed/torque point 306 or a situation where in minimum system loss is realized in spite of the transition loss, due to more efficient operation of the powertrain components, for example.

The powertrain system 20 described with reference to FIG. 1, including the engine 40 and the electric machine 35, advantageously facilitates operation of the engine 40 in the dynamic deactivation mode with the transmission 50 operating in one of the fixed gear states that is associated with low gear ratios. At low gear ratios, there may be higher engine torque demand due to higher acceleration demands as compared to operation at high gear ratios, and the higher engine torque demand may preclude operation of the engine 40 in the dynamic deactivation mode unless supplemental torque is supplied. As described with reference to FIG. 4, the electric machine 35 is capable of supplying motor torque that is supplemental to the engine torque, thus enabling operation of the engine 40 in the dynamic deactivation mode at fixed gear states of the transmission 50 that are associated with low gear ratios.

Figure 4:
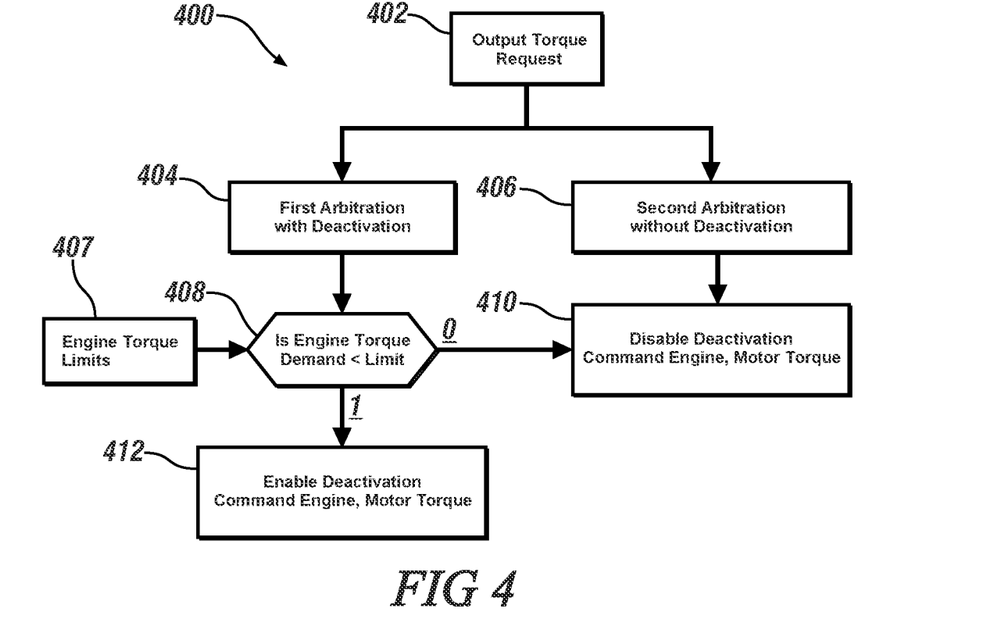
FIG. 4 schematically illustrates a process for controlling an embodiment of the powertrain system to generate torque while operating in a dynamic deactivation mode at low transmission gear states, in accordance with the disclosure.

FIG. 4 schematically shows a process 400 for controlling an embodiment of the powertrain system 20 described with reference to FIG. 1, including the engine 40 and the electric machine 35, wherein the engine 40 is selectively operative in the all-cylinder mode and the dynamic deactivation mode to generate torque during operation of the powertrain system 20, and the electric machine 35 is selectively operative to generate motor torque to supplement the engine torque to generate the output torque.

Inputs to the process 400 include the output torque request 402 and a transmission gear-based minimum engine torque for operating in the dynamic deactivation mode (407). The process 400 simultaneously executes a first arbitration (404) and a second arbitration (406) based upon the output torque request. The first arbitration (404) includes determining a first desired engine torque and a first desired motor torque for meeting the output torque request 402 when the engine 40 is operating in the dynamic deactivation mode. The first desired engine torque and the first desired motor torque are selected to achieve a minimum power cost, i.e., selected to maximize fuel economy that meets the output torque request 402. The second arbitration (406) includes determining a second desired engine torque and a second desired motor torque for meeting the output torque request 402 when the engine 40 is operating with the dynamic deactivation mode disabled. Again, the second desired engine torque and the second desired motor torque are selected to achieve a minimum power cost, i.e., selected to maximize fuel economy that meets the output torque request 402.

The first desired engine torque that is determined by the first arbitration (Step 404) is compared with the transmission gear and engine speed-based minimum engine torque for operating in the dynamic deactivation mode of step 407 (408). When the first desired engine torque is less than the transmission gear-based minimum engine torque for operating in the dynamic deactivation mode of step 407 (408)(0), operation of the powertrain system 20 is commanded with the output torque request being met by the electric machine 35 and the engine 40 operating in the all-cylinder mode (410). When the first desired engine torque is greater than the transmission gear-based minimum engine torque for operating in the dynamic deactivation mode of step 407 (408)(1), operation of the powertrain system 20 is commanded with the output torque request being met by the electric machine 35 and the engine 40 operating in the dynamic deactivation mode (412).

In this manner, the dynamic range associated with operating the engine 40 in the dynamic deactivation mode may be extended to include operation at low transmission gear ratios, which can reduce fuel consumption without negatively affecting the NVH of the powertrain system 20 to output torque requests at low vehicle speed conditions.

Figure 5:
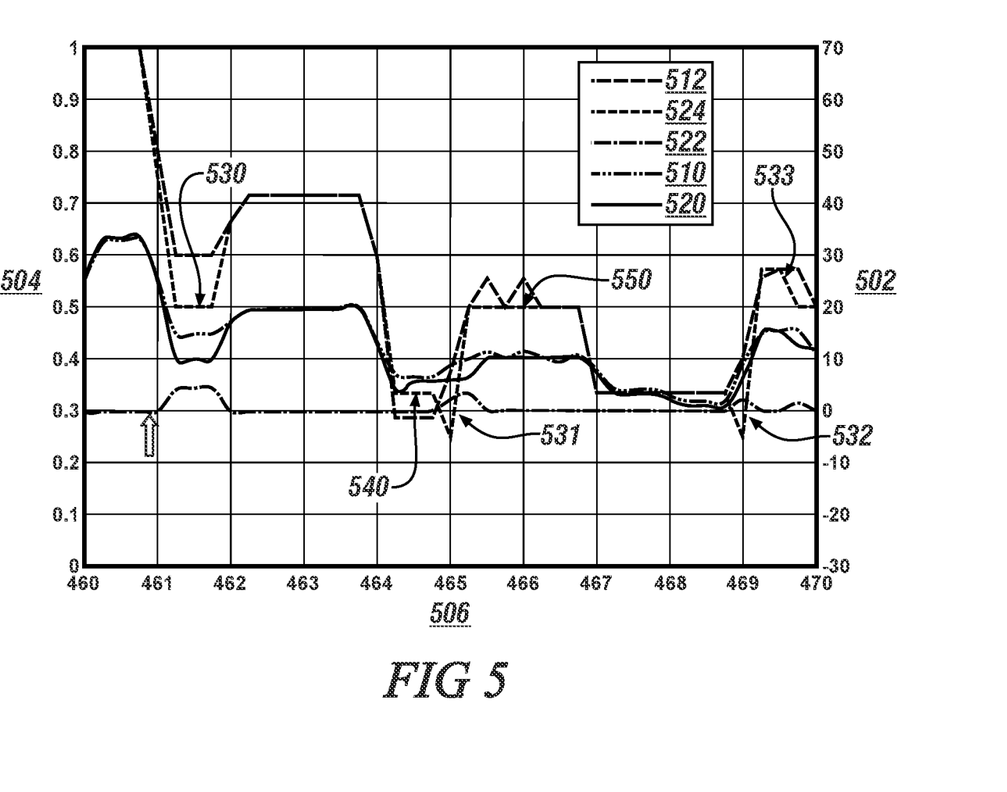
FIG. 5 graphically depicts results associated with two scenarios for operating an embodiment of the powertrain system described with reference to FIG. 1 in response to an output torque request, in accordance with the disclosure.

FIG. 5 graphically depicts results associated with two scenarios of operation of an embodiment of the powertrain system 20 described with reference to FIG. 1 with the transmission 50 operating in one of the fixed gear states throughout in response to an output torque request. Plotted results include engine power and motor power, indicated on the right vertical axis 502, and engine dynamic deactivation state, indicated on the left vertical axis 504, both shown in relation to time, indicated on the horizontal axis 506. In a first of the scenarios, the powertrain system 20 is operating with the output torque request being met completely by operation of the engine 40, i.e., a non-hybrid powertrain. In this first scenario, the engine power is indicated by line 510 and the engine dynamic deactivation state is indicated by line 512. In a second of the scenarios, the powertrain system 20 is operating with the output torque request being met by operation of the engine 40 with assistance from the electric machine 35. In the second scenario, the engine power is indicated by line 520, motor power is indicated by line 522, and the engine dynamic deactivation state is indicated by line 524.

Initially, the engine 40 transitions from operating in the all-cylinder mode to operating in the dynamic deactivation mode. As indicated at a first area 530, operation in the second scenario permits the engine 40 to operate at a lower dynamic deactivation state than is permitted in the first scenario, with the electric machine 35 supplying supplemental torque to meet the output torque request. The effect of this operation is also shown at points 531, 532, and 533.

At a second area 540, a transmission upshift event drives an increase in the dynamic deactivation state, but at a lower level of engine torque, and thus a lower level of fuel consumption as compared to the operation that includes having only the engine 40 operating to deliver torque, as compared to the second scenario.

At a third area 550, operation in the second scenario allows the powertrain system 20 to operate with a constant dynamic deactivation state with the engine power being unchanged, and with supplemental output torque being supplied via the electric machine 35. This operation reduces the quantity of dynamic deactivation mode transitions and thus reduces the associated losses, as compared to operation in the first scenario.

The concepts described herein leverage the capability of the electric machine to complement operation of the engine in the dynamic deactivation mode, and thus extend the dynamic operating range of the dynamic deactivation mode to lower transmission gear states than may be achievable when operating the engine in the dynamic deactivation mode without power assistance from the electric machine. The concepts described herein also expand the dynamic operating range of the electric machine, and thus extend operation in the hybrid mode.

The detailed description and the drawings or figures are supportive and descriptive of the present teachings. While some of the best modes and other embodiments for carrying out the present teachings have been described in detail, various alternative designs and embodiments exist for practicing the present teachings defined hereafter.

The invention claimed is:

1. A powertrain system configured to transfer torque to a driveline, comprising:
a multi-cylinder internal combustion engine (engine), a torque converter, a transmission, an electric machine, and a controller,
wherein the engine is configured to operate in one of an all-cylinder mode and a dynamic deactivation mode to generate an engine torque;
wherein the electric machine is configured to generate motor torque;
wherein the motor torque and the engine torque combine to generate an output torque that is transferable to the driveline and is responsive to an output torque request; and wherein the controller includes an instruction set that is executable to:
operate the engine in the dynamic deactivation mode to generate the engine torque; and
operate the electric machine to generate motor torque to supplement the engine torque to generate the output torque; including:
determine a first energy cost associated with a torque converter clutch slip to damp vibration induced by operation of the engine in the dynamic deactivation mode;
determine a second energy cost associated with operating the electric machine to damp vibration induced by operation of the engine in the dynamic deactivation mode; and
control the electric machine to damp vibration induced by operation of the engine in the dynamic deactivation mode when the second energy cost associated with operating the electric machine is less than the first energy cost associated with the torque converter clutch slip.

2. The powertrain system of claim 1, wherein the instruction set executable to operate the electric machine to generate motor torque to supplement the engine torque to generate the output torque when the engine is operating in the dynamic deactivation mode comprises the instruction set executable to:
determine an engine power trajectory;

determine a magnitude of loss associated with a transition from a first dynamic deactivation state to a second dynamic deactivation state in response to the engine power trajectory;

control the electric machine to generate the motor torque based upon the magnitude of loss associated with the transition from the first dynamic deactivation state to the second dynamic deactivation state; and control the engine to one of the first dynamic deactivation state and the second dynamic deactivation state.

3. The powertrain system of claim 2, wherein the instruction set executable to control the electric machine to generate motor torque based upon the magnitude of loss associated with the transition from the first dynamic deactivation state to the second dynamic deactivation state comprises the instruction set executable to:

control the engine to the first dynamic deactivation state; and control the electric machine to generate the motor torque to maintain operation of the engine in the first dynamic deactivation state to avoid a transition to the second dynamic deactivation state when the magnitude of loss associated with a transition from the first dynamic deactivation state to the second dynamic deactivation state is greater than a power cost of running the electric machine to generate motor torque to supplement the engine torque in response to the engine power trajectory.

4. The powertrain system of claim 2, wherein the instruction set executable to control the electric machine to generate motor torque based upon the magnitude of loss associated with the transition from the first dynamic deactivation state to the second dynamic deactivation state comprises the instruction set executable to:

control the engine dynamic deactivation state to transition to the second dynamic deactivation state when the magnitude of loss associated with the transition from the first dynamic deactivation state to the second dynamic deactivation state is less than a power cost of running the electric machine to generate the motor torque to supplement the engine torque in response to the engine power trajectory.

5. The powertrain system of claim 2, wherein the instruction set is executable to determine the engine power trajectory over a finite time horizon.

6. The powertrain system of claim 1, wherein instruction set executable to operate the electric machine to generate motor torque to supplement the engine torque to generate the output torque when the engine is operating in the dynamic deactivation mode comprises the instruction set executable to:

control the transmission in a low transmission gear state; and control the electric machine to generate motor torque to maintain operation of the engine in the dynamic deactivation mode at the low transmission gear state.

7. A method for controlling a powertrain system including a multi-cylinder internal combustion engine (engine), a torque converter, a transmission, and an electric machine that are configured to transfer torque to a driveline, the method comprising:

arranging the engine to operate in one of an all-cylinder mode and a dynamic deactivation mode to generate an engine torque, and operating the electric machine to generate motor torque, wherein the motor torque and the engine torque combine to generate an output torque that is transferable to the driveline and is responsive to an output torque request;

operating the engine in the dynamic deactivation mode to generate the engine torque; and operating the electric machine to generate the motor torque to supplement the engine torque to generate the output torque when the engine operates in the dynamic deactivation mode, including:

determining a first energy cost associated with torque converter clutch slip that may be implemented to damp vibration induced by operation of the engine in the dynamic deactivation mode, determining a second energy cost associated with operating the electric machine to damp vibration induced by operation of the engine in the dynamic deactivation mode, and controlling the electric machine to damp vibration induced by operation of the engine in the dynamic deactivation mode when the second energy cost associated with operating the electric machine is less than the first energy cost associated with the torque converter clutch slip.

8. The method of claim 7, wherein operating the electric machine to generate the motor torque to supplement the engine torque to generate the output torque when the engine is operating in the dynamic deactivation mode comprises:

determining an engine power trajectory;

determining a magnitude of loss associated with a transition from a first dynamic deactivation state to a second dynamic deactivation state in response to the engine power trajectory;

controlling the electric machine to generate the motor torque based upon the magnitude of loss associated with the transition from the first dynamic deactivation state to the second dynamic deactivation state; and controlling the engine to one of the first dynamic deactivation state and the second dynamic deactivation state.

9. The method of claim 8, wherein controlling the electric machine to generate the motor torque based upon the magnitude of loss associated with the transition from the first dynamic deactivation state to the second dynamic deactivation state comprises:

controlling the engine to the first dynamic deactivation state; and controlling the electric machine to generate the motor torque to maintain operation of the engine in the first dynamic deactivation state to avoid a transition to the second dynamic deactivation state when the magnitude of loss associated with a transition from the first state to the second state is greater than a power cost of running the electric machine to generate the motor torque to supplement the engine torque in response the engine power trajectory.

10. The method of claim 8, wherein controlling the electric machine to generate the motor torque based upon the magnitude of loss associated with the transition from the first dynamic deactivation state to the second dynamic deactivation state comprises:

controlling the engine to transition to the second dynamic deactivation state when the magnitude of loss associated with the transition from the first dynamic deactivation state to the second dynamic deactivation state is less than a power cost of running the electric machine to generate the motor torque to supplement the engine torque in response the engine power trajectory.

11. The method of claim 8, comprising determining the engine power trajectory over a finite time horizon.

12. The method of claim 7, wherein operating the electric machine to generate the motor torque to supplement the engine torque to generate the output torque when the engine is operating in the dynamic deactivation mode comprises:
controlling the transmission in a low transmission gear state and
controlling the electric machine to generate the motor torque to maintain operation of the engine in the dynamic deactivation mode at the low transmission gear state.

13. A method for controlling a powertrain system including a multi-cylinder internal combustion engine (engine), a torque converter, a transmission, and an electric machine that are configured to transfer torque to a driveline, the method comprising:
arranging the engine to operate in one of an all-cylinder mode and a dynamic deactivation mode to generate an engine torque, and operating the electric machine to generate motor torque, wherein the motor torque and the engine torque combine to generate an output torque that is transferable to the driveline and is responsive to an output torque request;
controlling the torque converter to operate in a controlled slip state;
operating the engine in the dynamic deactivation mode to generate the engine torque; and
operating the electric machine to generate the motor torque to supplement the engine torque to generate the output torque when the engine operates in the dynamic deactivation mode, including:
determining a first energy cost associated with torque converter clutch slip that may be implemented to damp vibration induced by operation of the engine in the dynamic deactivation mode,
determining a second energy cost associated with operating the electric machine to damp vibration induced by operation of the engine in the dynamic deactivation mode, and
controlling the electric machine to damp vibration induced by operation of the engine in the dynamic deactivation mode when the second energy cost associated with operating the electric machine is less than the first energy cost associated with the torque converter clutch slip.

14. The method of claim 13, wherein operating the electric machine to generate the motor torque to supplement the engine torque to generate the output torque when the engine is operating in the dynamic deactivation mode comprises:
determining an engine power trajectory;
determining a magnitude of loss associated with a transition from a first dynamic deactivation state to a second dynamic deactivation state in response to the engine power trajectory;
controlling the electric machine to generate the motor torque based upon the magnitude of loss associated with the transition from the first dynamic deactivation state to the second dynamic deactivation state; and
controlling the engine to one of the first dynamic deactivation state and the second dynamic deactivation state.

15. The method of claim 14, wherein controlling the electric machine to generate the motor torque based upon the magnitude of loss associated with the transition from the first dynamic deactivation state to the second dynamic deactivation state comprises:
controlling the engine to the first dynamic deactivation state; and
controlling the electric machine to generate the motor torque to maintain operation of the engine in the first dynamic deactivation state to avoid a transition to the second dynamic deactivation state when the magnitude of loss associated with a transition from the first state to the second state is greater than a power cost of running the electric machine to generate the motor torque to supplement the engine torque in response the engine power trajectory.

16. The method of claim 14, wherein controlling the electric machine to generate the motor torque based upon the magnitude of loss associated with the transition from the first dynamic deactivation state to the second dynamic deactivation state comprises:
controlling the engine to transition to the second dynamic deactivation state when the magnitude of loss associated with the transition from the first dynamic deactivation state to the second dynamic deactivation state is less than a power cost of running the electric machine to generate the motor torque to supplement the engine torque in response the engine power trajectory.

17. The method of claim 13, wherein operating the electric machine to generate the motor torque to supplement the engine torque to generate the output torque when the engine is operating in the dynamic deactivation mode comprises:
controlling the transmission in a low transmission gear state and
controlling the electric machine to generate the motor torque to maintain operation of the engine in the dynamic deactivation mode at the low transmission gear state.

* * * * *